United States Patent [19]
Nower et al.

[11] Patent Number: 5,371,953
[45] Date of Patent: Dec. 13, 1994

[54] SHAFT ALIGNMENT APPARATUS

[75] Inventors: Daniel L. Nower, Knoxville, Tenn.; Arthur R. Crawford, West Jefferson, Ohio; Kenneth R. Piety; Marvin L. Ward, both of Knoxville, Tenn.

[73] Assignee: Computational Systems, Inc., Knoxville, Tenn.

[21] Appl. No.: 66,728

[22] Filed: May 25, 1993

[51] Int. Cl.⁵ .................................................. G01B 5/25
[52] U.S. Cl. .................................... 33/645; 33/412; 33/529; 33/533; 33/661
[58] Field of Search ................. 33/645, 412, 529, 533, 33/655, 661; 248/228, 230, 231, 231.7, 904

[56] References Cited

U.S. PATENT DOCUMENTS

| | | | |
|---|---|---|---|
| 2,833,051 | 5/1958 | Cunningham | 33/572 |
| 3,525,158 | 8/1970 | Torlay | 33/661 |
| 3,631,604 | 1/1972 | Schenavar . | |
| 3,664,029 | 5/1972 | Glucoft et al. . | |
| 3,733,706 | 5/1973 | Blohm . | |
| 4,367,594 | 1/1983 | Murray, Jr. . | |
| 4,428,126 | 1/1984 | Banks . | |
| 4,451,992 | 6/1984 | Malak . | |
| 4,516,328 | 5/1985 | Massey | 33/412 |
| 4,534,114 | 8/1985 | Woyton et al. | 33/412 |
| 4,553,335 | 11/1985 | Woyton . | |
| 4,586,264 | 5/1986 | Zatezalo . | |
| 4,709,485 | 12/1987 | Bowman . | |
| 4,964,224 | 10/1990 | Jackson . | |
| 5,056,237 | 10/1991 | Saunders . | |
| 5,185,937 | 2/1993 | Piety et al. . | |
| 5,231,768 | 8/1993 | Beckweth, Jr. | 33/567 |

OTHER PUBLICATIONS

Aligning Shafts, Part I-Measuring Misalignment, pp. 86-90, Jan. 11, 1979.
Aligning Shafts, Part II-Correcting Misalignment, pp. 102-105, Feb. 8, 1979.

*Primary Examiner*—Christopher W. Fulton
*Attorney, Agent, or Firm*—Luedeka, Neely & Graham

[57] ABSTRACT

The specification discloses apparatus for aligning rotatable in-line machine shafts. In a preferred embodiment, the invention provides an alignment system having a sensed point positioned for rotation with the shaft to be aligned to provide a reference point against which misalignment is measured. The position of the sensed point is adjustable in three-dimensional space by an adjustment system so that the sensed point may be easily secured in a desired location to eliminate errors attributable to movement of the sensed point or improper location of the sensed point. In addition, the alignment system provides a capacitive displacement system to more accurately sense the sensed point, binary blocks to facilitate proper vertical positioning of the sensed point, and an improved chain assembly to facilitate mounting of the alignment system and to reduce errors of the type common to conventional alignment systems.

15 Claims, 7 Drawing Sheets

SHAFT ALIGNMENT APPARATUS

TECHNICAL FIELD

This invention relates generally to the art of aligning rotatable in-line machine shafts which are coupled together for operation by a shaft coupling. More particularly, the invention relates to mechanical systems for acquisition of data from which the amount of misalignment may be determined, and from which machine moves to bring the shafts into alignment can be determined.

BACKGROUND OF THE INVENTION

As is well known, whenever two rotating machine shafts are coupled together, such as the shaft of an electric motor and the shaft of a pump, it is important that the shafts be aligned within predetermined tolerances. Such shafts, when in perfect alignment, have their extended center lines (axes of rotation) coinciding along a straight line. Misalignment can lead to vibration, excessive wear, and ultimate destruction of couplings, bearings, seals, gears and other components.

A number of shaft alignment methods are known, which generally have in common the use of suitable alignment fixtures, also termed alignment brackets. The alignment brackets are employed to measure particular relative displacements (also termed offsets) as the shafts typically are rotated together through one revolution, taking readings at various angular positions. Traditionally the shafts are stopped at the 0°, 90°, 180° and 270° angular positions to take readings. However, readings may be taken at a number of angular positions other than 0°, 90°, 180° and 270°. Each relative displacement is measured between a point referenced to one of the shafts by means of the alignment bracket and a point on the other shaft. Dial indicators are often employed, these dial indicators having a plunger which moves a hand on the face of the dial indicator.

The readings are then used to calculate machine moves which will bring the shafts into alignment. The 0°, 90°, 180° and 270° angular positions at which readings are conventionally taken lie in geometric planes in which either of the machines, for example the motor, may be moved for purposes of alignment. In particular, the mounting bolts of the machine may be loosened, and the machine may be either moved in a horizontal plane, or moved in a vertical plane by placing or removing shims under one or more of the feet of the machine, or both. There are well developed calculation methods and procedures known in the art for determining what machine moves are needed to achieve an acceptably aligned condition based on measurement of relative displacement data at the 0°, 90°, 180° and 270° positions mentioned.

In one type of alignment bracket, a base is firmly clamped, as by a chain, or otherwise affixed to one shaft, and an extension bar or arm extends laterally from the base in a direction generally parallel to the shafts across the coupling to a reference point. A device for measuring displacement of the reference point relative to the shaft, such as an analog dial indicator, is positioned so as to measure relative displacement in a radial direction from the reference point to the periphery of the other shaft when the shafts are positioned at the 0°, 90°, 80° and 270° angular positions. The position of the alignment bracket is then reversed so as to be fixedly referenced to the other shaft, establishing a reference point adjacent a point on the periphery of the one shaft, and the procedure is repeated. Alternatively, a pair of alignment brackets may be employed for simultaneous readings.

Because such alignment brackets are designed for use with a wide range of shaft sizes, they are typically provided with a chain long enough to be used with the largest shaft size. Thus, when used with the small shaft sizes, there is usually a significant length of free chain that hangs freely from the alignment bracket. This free chain can bump against the alignment bracket and the shaft when the shaft is rotated during the taking of measurements. Because of the sensitivity of the measuring device, particularly analog dial indicator devices, this bumping can cause errors in readings. In addition, the free length of chain is cumbersome and otherwise complicates the taking of measurements.

In addition to being extremely sensitive to contact, analog dial indicator type devices are difficult to zero, do not indicate the relative direction of displacement and have significant parallax errors.

Still another disadvantage of prior art alignment devices results from difficulty in aligning the devices so that accurate results are obtained. This is especially true when the co-rotating shafts are significantly different in size. Particularly, in such situations it difficult and time consuming to position alignment devices so that they both adequately clear the coupling and are substantially the same height above the coupling. Moreover, even if this is accomplished, mechanical limitations in the systems make it difficult and time consuming to ensure that the displacement of the plungers of the sensors is a true reflection of the condition of the shafts.

Yet another problem results from difficulties positioning the devices on the shafts so that they are spaced apart to correspond to the dimensions of the measuring device. This difficulty can result, for example, from clearance problems present in the machine environment.

Accordingly, there exists a need in the art for an improved mechanical shaft alignment system which is easier to set up and use and which reduces the error in measurement and other problems which inherently result from the design of prior art devices.

SUMMARY OF THE INVENTION

To address the foregoing and other problems and shortcomings with prior art alignment devices, the present invention provides a system for measuring misalignment between first and second in-line shafts. The system includes a first base for being positioned and releasably attached to the first shaft. Likewise, a second base is provided and releasably attached to the second shaft so that the first and second bases are positioned in an opposed relationship spaced apart by an approximate selected distance. A sensor is connected to the first base for sensing the position of a sensed point. Preferably, an elongate extension projects from the second base toward the first base and disposes the sensed point in a desired location for being sensed by the sensor. An adjustment mechanism is provided to adjust the position of the sensed point in a 3-dimensional space so that the sensed point may be adjustably positioned to a desired position which is defined as a zero position. The sensor senses the position of the sensed point as the shafts are rotated and produces an output signal indicating the movement of the sensed point in a radial direction toward and away from the shafts.

In the preferred embodiment, the sensed point is a ball defined on one end of the rod. An anvil is provided for engaging and holding the rod and for allowing the position of the ball to be adjusted in a 3-dimensional space.

In accordance with a preferred embodiment of the present invention, a plurality of binary blocks are provided to enable height adjustment of the sensor means and the sensed means. The blocks are configured for being selectively attached and stacked on the first and second bases. Thus, the blocks are positioned between a base and a sensor means or between a base and sensed means. The bases are called binary blocks because their height is chosen so that they can be combined in binary combinations to achieve a plurality of different heights. Preferably, the first block has a height of one unit, the second block has a height of two units, the third block has a height of four units, etc. These blocks are combined in a binary fashion to achieve incremental unit increases in the height adjustment. For example, if a five unit height increase is desired, the first and third blocks would be stacked together to achieve a five unit height increase. As another example, to achieve a three unit increase, the first and second blocks would be stacked together.

In accordance with another aspect of the preferred embodiment, the sensor means is preferably a capacitive displacement sensor, and the attachment means is preferably an elongate chain and further includes means for securing the tag end of the chain so that it is maintained in a substantially stationary position relative to the shaft during the rotation of the shaft.

BRIEF DESCRIPTION OF THE DRAWINGS

The above and other features and advantages of the present invention will become further known from the following detailed description when considered in conjunction with the accompanying drawings in which:

FIGS. 6b and 6c are left and right side view of the block of FIG. 6a, and FIG. 6d is a top plan view of the block of FIG. 6a;

DETAILED DESCRIPTION

Figure 1:
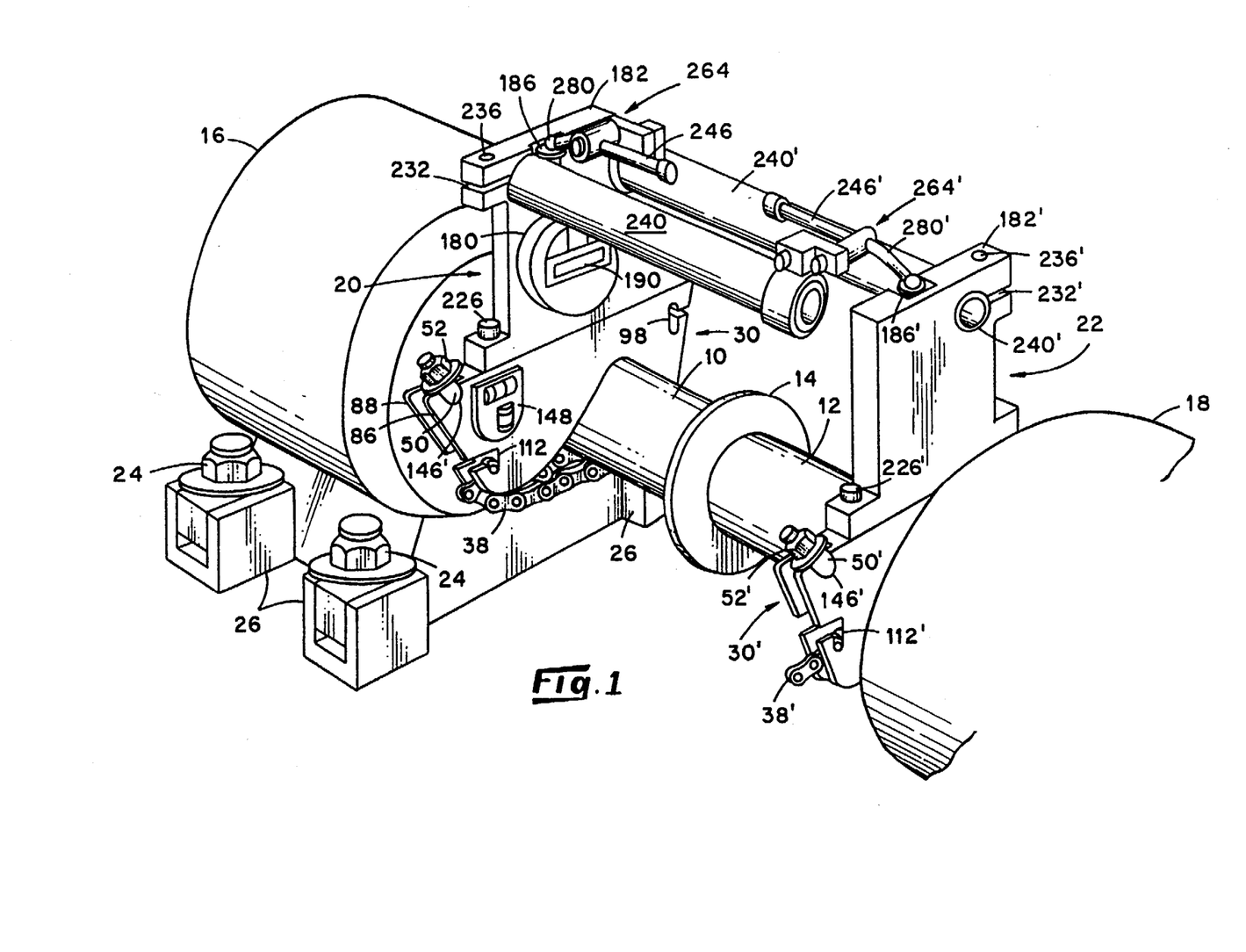
FIG. 1 depicts in overview the general environment of first and second rotatable and in-line shafts connected respectively to first and second machines, with alignment systems in accordance with the present invention mounted on the shafts and spanning the coupling for measuring relative displacement at various angular positions.

With reference now to the drawings in which like reference characters designate like or similar parts throughout the several views, FIG. 1 shows first and second in-line shafts 10 and 12 coupled to each other by means of a coupling 14. The shafts 10 and 12 are connected to respective machines such as a motor 16 driving a pump 18 through the shafts 10 and 12 and coupling 14. A first alignment system 20 and a second alignment system 22 are mounted on the shafts 10 and 12, respectively, for measuring the degree of misalignment of the shafts.

After the degree of misalignment is measured, one of the machines is moved after loosening its mounting bolts 24, moving the machine in a horizontal plane, and/or inserting or removing shims under one or more machine feet 26, all as necessary, to bring the shafts 10 and 12 into an aligned condition, as is well known.

Figure 2:
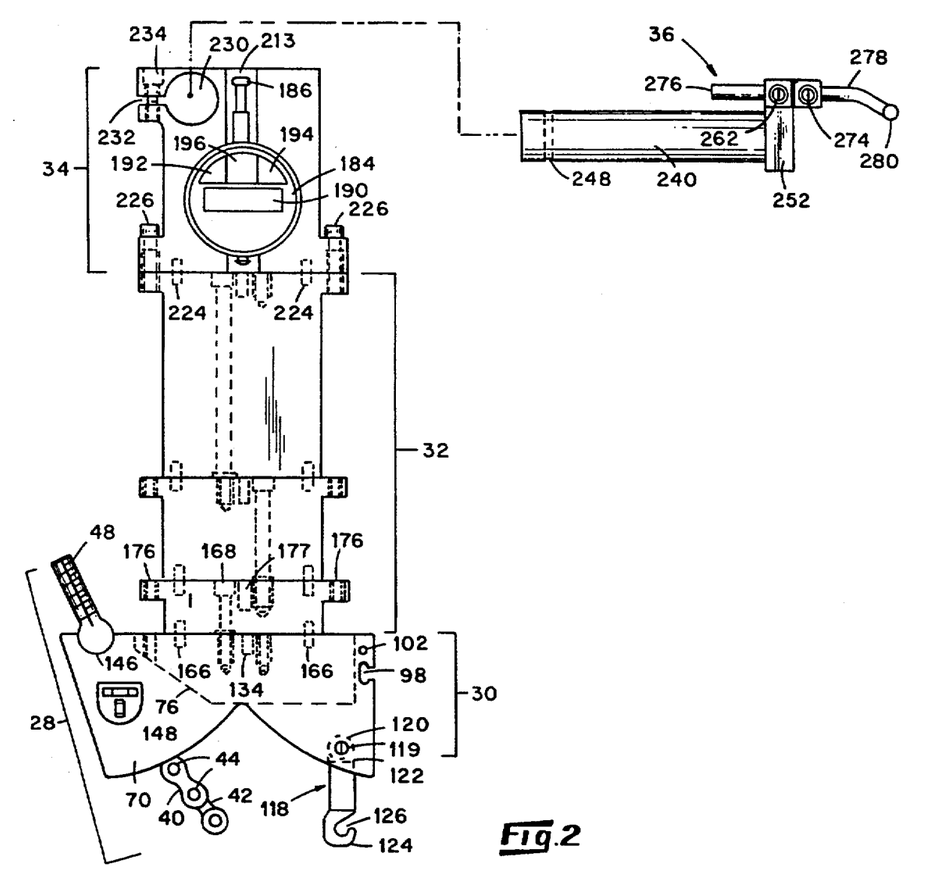
FIG. 2 is a somewhat diagrammatical front elevational view of an alignment system for measuring relative displacement of rotatable in-line shafts with an extension arm removed.

With added reference now to FIG. 2 the alignment system 20 includes a chain assembly 28, a mounting base 30, a binary extension block system 32, a sensor assembly 34, and an extension arm assembly 36. The alignment system 22 is identical to the alignment system 20. The below-described alignment system 20 is adapted to fit shaft sizes between about ⅜ inch and 26 inches in diameter coupled together by couplings up to about 40 inches in diameter.

Chain Assembly

Figure 3:
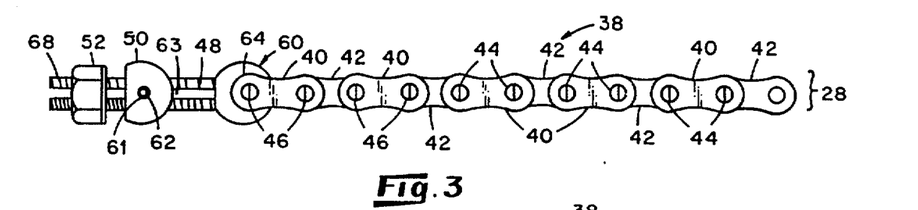
FIG. 3 is a side elevational view of a chain assembly.
Figure 4:
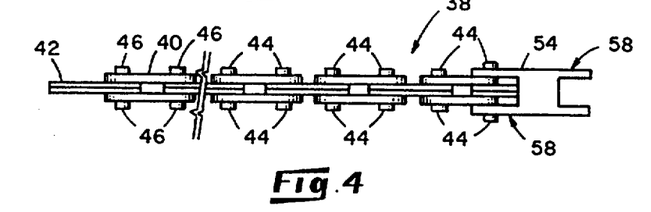
FIG. 4 is a top plan view of a section of a chain.
Figure 5:
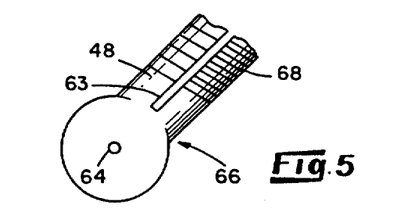
FIG. 5 is a detail view of a tightening bolt used to mount the alignment system onto the shaft of the machine.

With reference to FIGS. 3, 4 and 5, the chain assembly 28 includes an elongate chain 38 having a plurality of interconnected outer links 40 and inner links 42 connected together by link pins 44 and 46, a tensioning bolt 48, a cylinder 50 and a nut 52. As can be seen, the link pins 46 are shorter than the link pins 44 so that they may be received within the mounting block 30, as will be explained more fully below. The overall length of the chain 38 is preferably between about 18 and 30 inches and may be up to about 81 inches in length for the described embodiment. A chain clip 54 is fittingly received onto one of the link pins 44 near a free end 56 of the chain.

The clip 54, best seen in FIG. 4, is formed of Delrin ®, an acetal resin available from Dupont and has opposite and identical ends 58. Each end 58 sized to resiliently engage and clamp one of the link pins 44. A roll pin 61 is preferably inserted into an opening 62 defined through approximately half the thickness of the cylinder 50 to slidingly engage a longitudinal slot 63 defined on one side of the bolt 48 and prevent rotation of the bolt 48 and the cylinder 50 relative to one another (FIG. 3). The opposite end 60 of the chain 38 is connected to the tensioning bolt 48, as by pin 46 extending through an opening 64 in a lower end 66 of the tensioning bolt 48 (FIG. 5).

The tensioning bolt 48 is slidably received within a bore that extends through the cylinder 50, the cylinder 50 being provided for pivotally connecting the chain 38 to the mounting base 30. The pivotal connection is provided to facilitate mounting of the alignment system 20 to different size shafts. Upper threaded end 68 of the tensioning bolt 48 extends past the bore of the cylinder 50 and is threadably received by the nut 52 for tensioning the chain assembly 28, as will be explained more fully below in connection with the description of the mounting base.

Mounting Base

Returning to FIG. 2 and with reference to FIGS. 6a, 6b, 6c, and 6d, the mounting base 30 is a unitary structure having a front surface 70, an identical rear surface 72, top surface 74, and an inner body 76 (shown in phantom) located between the front and rear surfaces 70,72 and opposite the top surface 74.

Figure 6A:
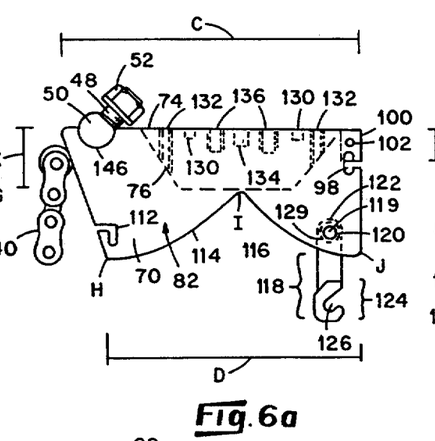
FIG. 6a is a front elevation view of a mounting block provided in accordance with the present invention.

The front surface 70 is parallel to and spaced apart a distance A of ¾ inch from the rear surface 72, and a cavity 82 is formed between the front and rear surfaces 70,72 below the inner body 76. The front and rear surfaces 70,72 are formed in part on plates 86,88, respectively having a thickness B of ⅛ inch, an upper width C of 6⅛ inches, a lower width D of 5 5/16 inches, and a height E of 2¾ inches.

Corresponding and aligned T-shaped cutouts 90,92 (FIG. 6c) are provided on right side edges 94,96 of the front and rear plates 86,88 to provide a T-slot 98 (FIG. 6a) sized to receive one of the link pins 44 of the chain 38. A rubber grip 100 having a rectangular profile is fittingly received and maintained between the surfaces 70,72 adjacent the T-slot 98 by a roll pin 102 to engage the link 40 inserted therein so that the link pin 44 of the link is forced downwardly into the lower portion of the T-slot 98 and is frictionally maintained within the T-slot.

Similarly, corresponding and aligned L-shaped cutouts 104,106 (FIG. 6b) are provided on left side edges 108,110 of the front and rear plates 86,88 respectively, to provide an L-slot 112 (FIG. 6a) sized to receive one of the link pins 44 of the chain 38. The T-slot 98 is located a distance F of about ⅝ inch from the top surface 74 and the L-slot 112 is located a vertical distance G of about 2 inches from the top surface 74.

Corresponding and aligned lower edges 114,116 (FIG. 6a) of the front and rear surfaces 70,72, respectively, are curved so that the mounting base 30 can fit all shaft sizes in the range indicated above. In this regard, the lower edges 114,116 have a radius of curvature of 3.6 inches between points H and I and between points I and J. The distance K from point I to the top surface 74 is 1 5/16 inches.

Figure 6B:
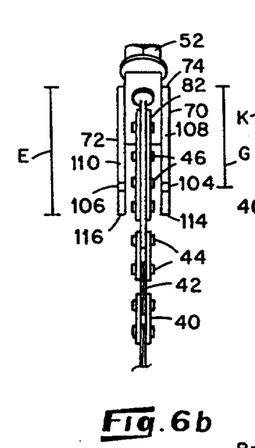
Figure 6C:
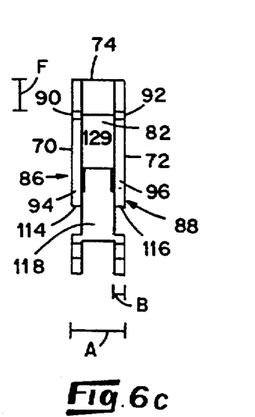

A pivot link 118 is pivotally secured within the cavity 82 between the front and rear plates 86,88 by a hinge pin 119 that extends through an aperture 120 in plates 86,88 and an upper end 122 (shown in phantom) of the pivot link 118. A hook 124 sized to receive one of the link pins 44 is provided at the opposite end of the pivot link 118 and is oriented so that open side 126 of the hook 124 faces right away from the left side of the base 30. A wave washer 129 is preferably provided between each side of the link 118 and the cavity 82, as best seen in FIGS. 6a and 6c.

Figure 6D:
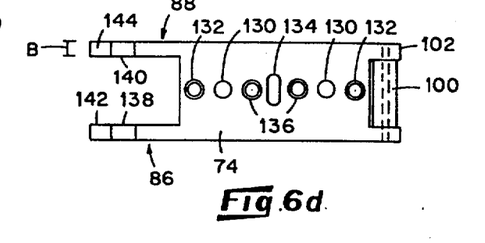

With particular reference to FIG. 6d, smooth dowel bores 130 and threaded bores 132 are provided on the top surface 74 for mounting of the sensor assembly 34. A recessed slot 134 is also provided on the top surface 74 to provide clearance for the operation of the sensor assembly 34, as will be explained more fully below. In some instances, such as when the coupling 14 is large, it may be necessary to mount the binary block system 32 on the mounting base 30 first and then mount the sensor assembly 34 to the binary block system 32. To this end threaded bores 136 are provided on the top surface 74 for mounting of the block system 32.

As mentioned previously, the tensioning bolt 48 is slidably received within a bore that extends through the cylinder 50, the cylinder 50 being provided for mounting the chain 38 to the mounting base 30. To this end, corresponding and aligned cylindrical cutouts 138,140 are provided adjacent the top surface 74 on top edges 142,144 of the front and rear plates 86,80, respectively, to provide a cylindrical cradle 146 sized to receive the cylinder 50.

Figure 7:
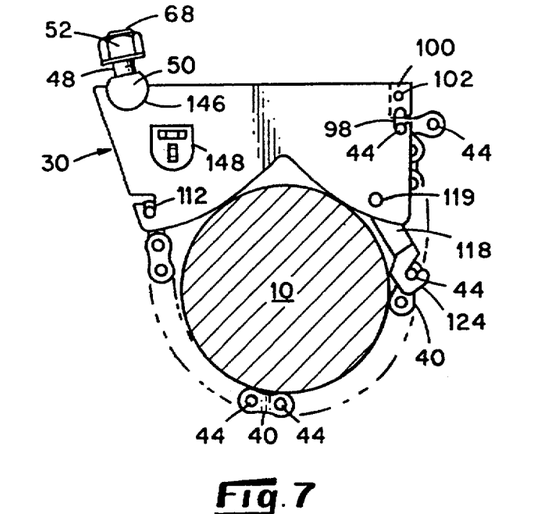
FIG. 7 is a front elevational view showing one manner in which the mounting block may be mounted onto the shaft.
Figure 8:
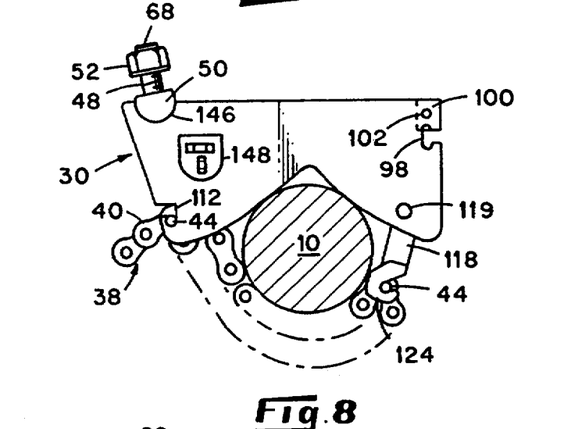
FIG. 8 is a front elevational view showing another manner in which the mounting block may be mounted onto the shaft.
Figure 9:
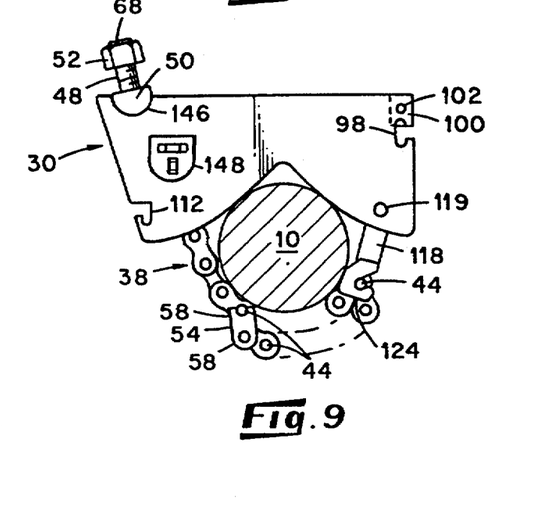
FIG. 9 is a front elevational view showing still another manner in which the mounting block may be mounted onto the shaft.

With reference now to FIGS. 7, 8 and 9, the mounting base 30 is shown mounted on the shaft 10 by the chain assembly 28. To mount the base 30, the tensioning bolt 48 to which the chain 38 is attached is passed through the cylinder 50 and the cylinder 50 is positioned within the cradle 146, it being understood that the cylinder 50 is pivotable within the cradle to accommodate different shaft sizes. The nut 52 is threaded onto the upper threaded end 68 of the bolt 48 to prevent the bolt 48 from sliding back through the cylinder 50. The chain 38 is then positioned around the lower half of the shaft 10 and the link 44 closest to the pivot link 118 is positioned within hook 124.

The nut 52 is rotated, as by a wrench, to tighten the chain 38 against the shaft, it being understood that the pivot link 118 will pivot towards the shaft 10 as the chain 38 is tightened and that this pivoting feature together with the pivoting feature of the cylinder 50 permits the mounting base 30 to be mounted on a variety of shaft sizes. Prior to tightening the nut 52, it is preferable to verify that the base 30 is level, as by the use of a four-point level 148 magnetically mounted on the front surface 62 of the mounting base. After the nut 52 is tightened, depending on the length of the chain 38 and the size of the shaft, the remaining free end 56 of the chain 38 is secured to the mounting base 30 using the T-slot 98, as shown in FIG. 7, or the L-slot 112 as shown in FIG. 8, or both and/or secured to itself with the chain clip 54 as shown in FIG. 9. To secure the chain 38 in the T-slot 98, the pins 44 of a chain link 40 is aligned with and forced into the T-slot 98 against the resiliency of the rubber grip 100. Once the link 40 is fully inserted into the T-slot 98, the resiliency of grip 100 forces the link pin 44 into one side of the T-shape of the T-slot 98 and thereby resiliently captures it. When the L-slot 112 is used, there is no rubber grip to secure the link pin 44 in the L-slot 112, but the tension placed on chain 38 is sufficient to hold it in place if the slack in chain 38 was properly apportioned about equally between that portion extending from cylinder 50 to hook 124 and that portion extending from hook 124 to slot 112. In addition the end 56 of chain 38 may be secured to the chain 38 by clip 54 and the resultant force on the end 56 will help hold the chain in the L-slot 112.

To better illustrate the function of the clip 54 (shown in detail in FIG. 4), the pins 44 extend through chain links 40 and 42 for about ⅛" on both sides and, thus, the pins 44 are configured to engage the T-slot 98 and L-slot 112 as previously described. Likewise, the ends 58 of the resilient clip 54 engage and resiliently clip onto the ends of link pins 44, as shown in FIG. 9. Accordingly, it will be appreciated that clip 54 may be used to clip two portions of chain 38 together in a side-by-side relationship. As noted previously, the pins 46 are shorter than the pins 44. The pins 46 extend through chain links 40 and 42 (best seen in FIG. 4) for about 1/16" on both sides and, thus the pins 46 are configured to pass between the plates 86,88 so that they may be received within the cavity 82, as best seen in FIG. 6b.

It will therefore be appreciated that by the use of the appropriate combination of the T-slot 98, L-slot 112, and chain clip 54, depending on the chain length and shaft size, the chain 38 may be secured so that it remains in a substantially non-moving relationship to the mounting base 30 and does not flop about during the taking of misalignment measurements and cause errors in the measurements.

Once the mounting base 30 is mounted to the shaft 10 with the chain assembly 28, the binary block system 32 or the sensor assembly 34 may be mounted to the mounting base 30, depending on the size of the coupling 14 and the relative sizes of the shafts 10, 12. For coupling sizes with radii up to about four and one-half inches greater than the shaft the mounting base is mounted to or for similar sized shafts (i.e. those which are less than about one inch different in diameter), the sensor assembly 34 may be mounted directly to the mounting base. For larger couplings or for shafts of nonsimilar diameter, it is necessary to mount the binary block system 32 to the mounting base 30 and then mount the sensor assembly 34 to the binary block system 32 so that the sensor assembly 34 will be positioned above the coupling 14 and the alignment systems 20 and 22 will be substantially aligned in a horizontal plane above the shafts 10,12.

Binary Block System

Figures 10, 10A, 11:
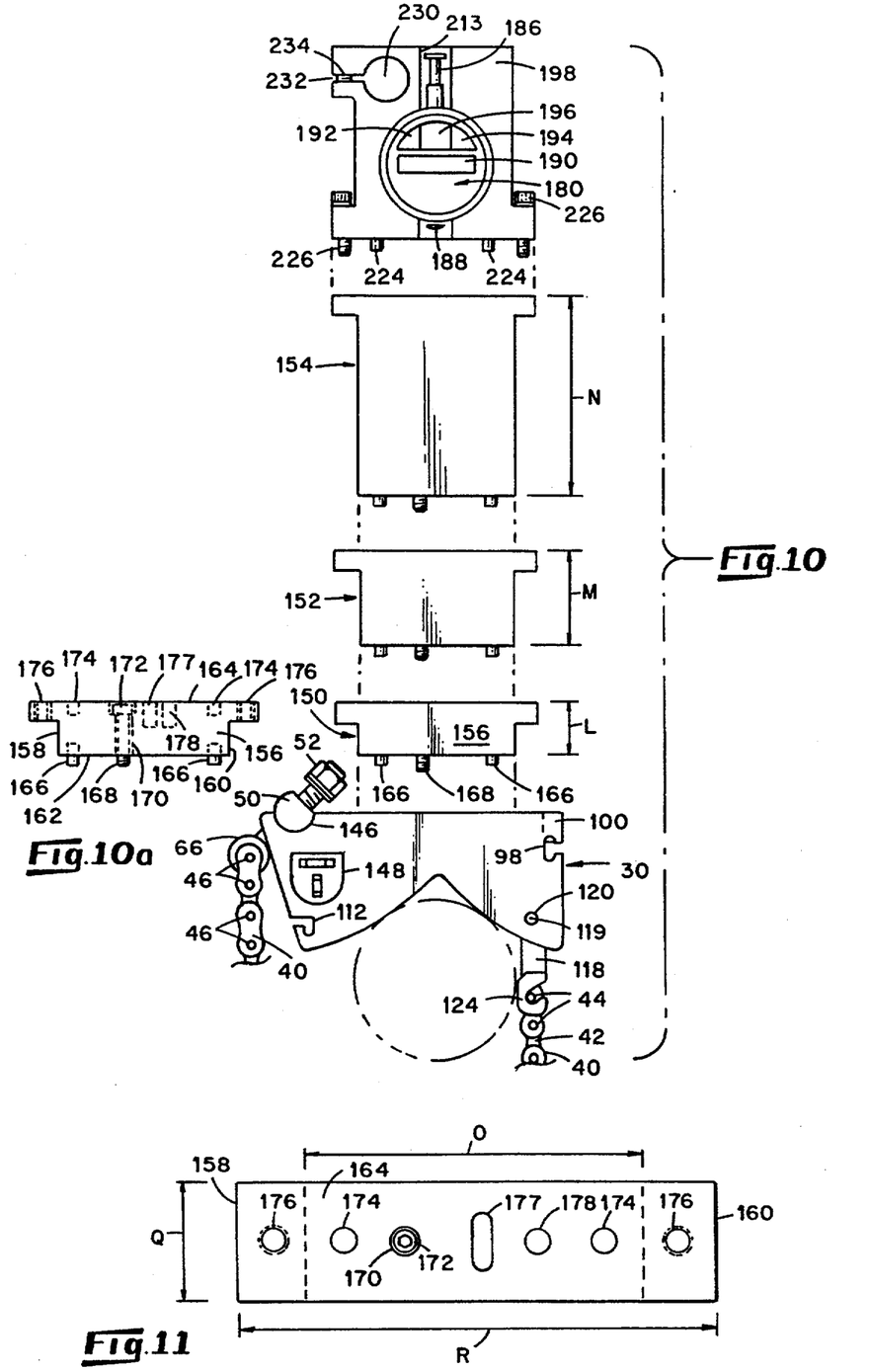
FIG. 10 is an exploded view showing the alignment system of the present invention.
FIG. 10a is a detail view of a binary block.
FIG. 11 is a top plan view of a binary block.

The binary block system 32 is preferred for use with couplings 14 whose diameter is about 9½ inches greater than the shaft diameter the fixture is mounted to and when the diameters of the shafts 10 and 12 differ by more than about 1 inch. For larger couplings or greatly different shaft sizes, it will be understood that multiple binary block systems may be used. With particular reference to FIGS. 10, 10a and 11, the binary block system 32 preferably includes binary blocks 150,152,154. The binary blocks 150,152,154 are identical in construction and configuration, except for their height. Binary block 150 has a height L of 1 inch, binary block 152 has a height M of 2 inches, and binary block 154 has a height N of 4 inches. For the sake of brevity, the particular configuration of the blocks will be described in connection with binary block 150, it being understood that the binary blocks 152,154 are identical except for their height.

With continuing reference to FIGS. 10, 10a and 11 and with reference to FIG. 2, binary block 150 is generally T-shaped and has a front side 156 having a width O of 3 inches, left-hand side 158, right-hand side 160, bottom 162, and top 164 each having a width Q of ¾ inch. The top 164 has a length R of 4 inches so that it overhangs each of the sides 158,160 by ½ inch.

The bottom 162 of the binary block 150 may be mounted to the top surface 74 of the mounting base 30 and the sensor assembly 34 or one or more of the binary blocks 152,154 may be mounted to the top 164 of the binary block 150, depending on the height of the coupling 14. Dowels 1166 and a mounting screw 168 extend from the bottom 162 at locations corresponding to the smooth bores 130 and one of the threaded bores 136 of the top surface 74 of the mounting block 30, it being understood that the mounting screw 168 will align with either one of the threaded openings 136, the particular one being determined by the direction that the mounting block is facing.

Accordingly it will be appreciated that the dual threaded bores 136 are provided on the top surface 74 of the mounting block 30 for ease of installation of the binary block system, in that the user does not need to be concerned with the direction that the binary block is facing. The mounting screw 168 is about 1 and ¼ inches in length and extends through a smooth bore 170, including a bore recess 172, (shown in phantom) defined through the binary block 150. The bore recess 172 is formed at the top 164 of the binary block 150 at a location that corresponds to the location of one of the threaded bores 136 of the top surface 74 of the mounting block 30.

The top 164 of the binary block 150 is configured to receive either the sensor assembly 34 or one of the binary blocks 152,154. Accordingly, it will be understood that the top 164 is configured similar to the top surface 74 of the mounting base 30. To this end, smooth dowel bores 174 and threaded apertures 176, corresponding to the dowel apertures 130 and threaded apertures 132 of the top surface 74 of the mounting base 30, are provided on the top 164 of the binary block 150 for mounting of the sensor assembly 34. A recessed slot 177, corresponding to the recessed slot 134 on the top surface 74 of the mounting base 30, is also provided on the top surface 74 to provide clearance for the operation of the sensor assembly 34.

A threaded opening 178, corresponding to one of the threaded openings 136 of the top surface 74 of the mounting base 30, is provided on the top 164 of the binary block 150 for mounting of additional binary blocks if necessary. As mentioned above, the bore 170 exits the top 164 of the binary block 150 at a location on the top 164 the binary block 150 that corresponds to the location of the other opening 114 of the top surface 74 of the mounting base 30.

It is a feature of the present invention that the binary blocks 150,152,154 have heights of 1 inch, 2 inches and 4 inches respectively. This permits the binary blocks 150, 152, 154 to be stacked onto one another to provide clearance over the coupling 14 or to account for shaft size differences of up to 7 inches in increments of one inch. This is advantageous, since it is desirable to align the sensor assemblies of the systems 20,22 in a horizontal plane above the shafts 10 and 12. The specific combinations are shown in Table 1

TABLE 1

| Combination of binary blocks | height(inches) |
|---|---|
| Binary block 150 | 1 |
| Binary block 152 | 2 |
| Binary blocks 150 and 152 | 3 |
| Binary block 154 | 4 |
| Binary blocks 150 and 154 | 5 |
| Binary blocks 152 and 154 | 6 |

TABLE 1-continued

| Combination of binary blocks | height(inches) |
|---|---|
| Binary blocks 150, 152 and 154 | 7 |

Sensor Assembly

Figure 12:
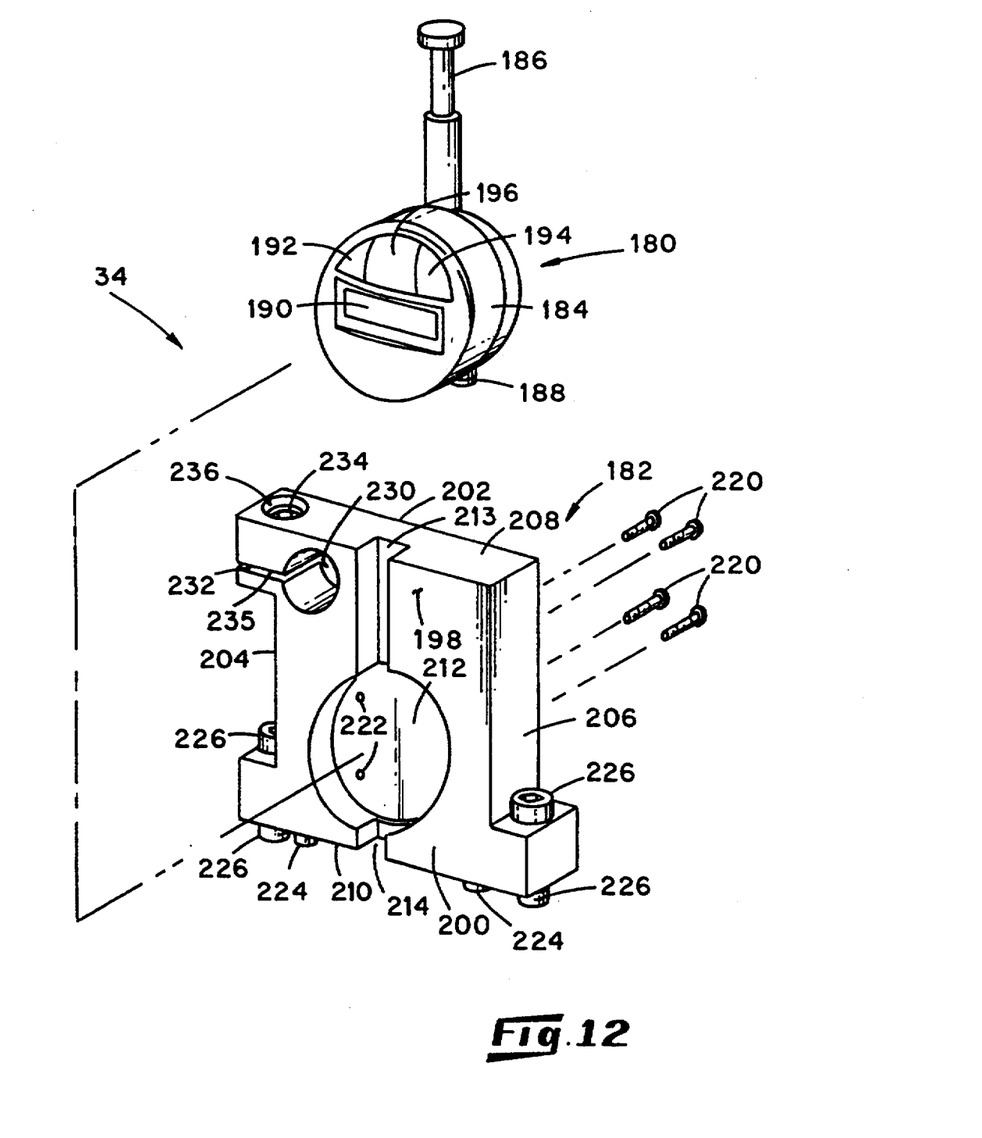
FIG. 12 is an exploded view showing a sensor assembly.

Turning now to FIG. 12 the sensor assembly 34 includes a sensor 180 mounted to a sensor head 182 supported by the mounting base. The sensor 180 has a circular body 184 and a plunger 186 extending upwardly from the body 184. When measuring misalignment, the plunger 186 is displaced into a channel (not shown) within the body 184 so that a bottom end 188 of the plunger 186 emerges from the body 184 of the sensor 180 in accordance with the degree of displacement and the displacement appears on digital display 190. In addition, the sensor 180 includes an on/zero switch 192, an off switch 194, and a units switch 196 to select the display in either inches or millimeters.

The sensor 180 is preferably a Series 543 digital capacitive displacement sensor available from Mitutoyo of Japan. The principles of such sensor are described in *A Patterned Capacitance Absolute Displacement Sensor*, pp. 50–52, SENSORS (August 1992), incorporated herein by reference. The plunger 186 of the preferred Mitutoyo sensor has a maximum displacement of about ½ inch. Thus, since it is desired to zero the sensor 180 when the plunger 186 is displaced a distance equal to half of its maximum displacement (so that negative and positive displacements may be measured), a mark 198 is provided on the sensor head to indicate the displacement midpoint (0.25 inch).

The Mitutoyo capacitive displacement sensor is a low-power, battery operated device that offers improved accuracy over mechanical devices and also has fewer parallax errors. Moreover, this sensor is easy to zero and is able to indicate the direction of the displacement. Still another advantage of this sensor is that positive or negative movement may be tracked automatically and the user need not keep track of the direction of the movement. Accordingly, it will be appreciated that superior results may be obtained by use of this type sensor. However, it will be understood that various other types of sensors, i.e. analog, lasers, electronic field detectors, may also be used in the present invention.

The sensor head 182 is a unitary structure having a front 200, rear 202, left-hand side 204, right-hand side 206, top 208, and base 210. A recess 212 sized to fit the body 184 and a recess 213 sized to fit the plunger 186 of the sensor 180 are defined on the front 200 of the sensor head 182. Optionally, the recess 213 may be formed completely through the head 182 so that the plunger 186 may also be accessed from the rear 202 of the sensor head 182. In addition, a cutout 214 is provided through the base 210 to provide clearance for the bottom end of the plunger 186. The sensor 180 is secured within the recess 212 by a plurality of screws 220 which pass through openings 222 defined through the rear 202 of the sensor head 182.

The sensor head 182 may be mounted to either the mounting base 30 or one of the binary blocks 150,152,154. Accordingly, a pair of dowels 224 and mounting screws 226 are provided on the base 210 at locations corresponding to the dowel apertures 130 and threaded openings 132 of the top surface 74 of the mounting base 30 or the dowel apertures 174 and threaded apertures 176 of the binary blocks 150,152,154. The cutout 214 is located so that it aligns with the recessed slot 134 of the mounting base 30 or the recessed slot 177 of the binary blocks.

A circular bore 230 extends between the front 200 and rear 202 of the sensor head 182 at the upper left of the sensor head for receiving the extension arm assembly 36. The diameter of the bore 230 is adjustable so that the bore 230 may be closed around the assembly 36 to secure it in place. To this end, a slit 232 is formed between the bore 230 and the left-hand side 204 of the sensor head 182 and the width or spacing of the slit 232 is adjustable by means of an adjustment screw 234 positioned within a smooth bore 236 formed in the sensor head 182 above the slit 232 and threadably received within a corresponding and aligned threaded opening 235 formed in the sensor head 182 below the slit 232.

Extension Assembly

Figure 13:
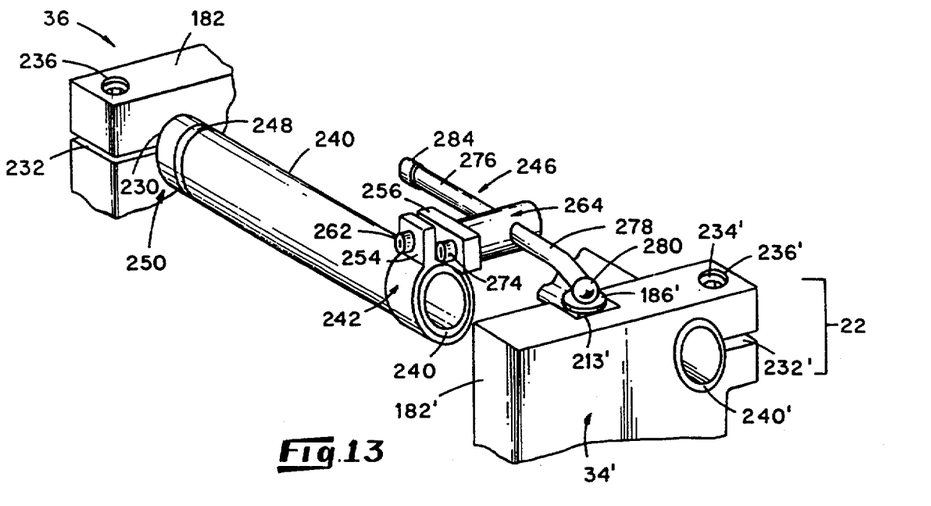
FIG. 13 is a partial perspective view showing the relative positioning of the alignment systems during the measuring of the relative displacement or misalignment of the shafts.
Figure 14:
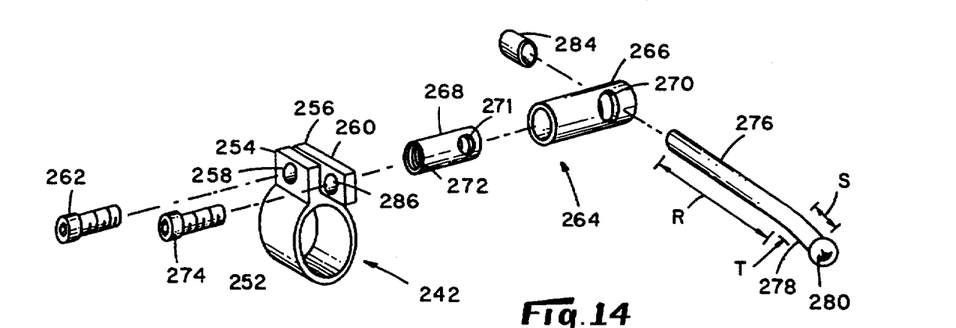
FIG. 14 is an exploded close-up view of a tap assembly in accordance with the present invention.

As best shown in FIGS. 13 and 14, the extension arm assembly 36 includes an extension tube 240, a tube clamp 242, and a tip 246. The extension tube 240 is preferably an elongate tube formed of 1″ O.D. steel and having a length of between about 4 and 12 inches, it being preferred that several lengths of tube be available for use so that various machine configurations may be accommodated.

A color code 248 corresponding to the length of the tube 240 is preferably provided near end 250 of the tube 240 so that the appropriate length tube may be readily selected. For example, the color code for a 4 inch tube may be blue and the color code for a 6 inch tube may be green so that the user may readily select the desired tubes when they are commonly stored. The end 250 of the extension tube is fittingly received within the bore 230 of the sensor head 182 flush with the rear 202 of the sensor head 182 and the diameter of the bore 230 is adjusted with the adjustment screw 234 to secure the tube 240 within the bore 230. Elements of the alignment system 22 corresponding to elements of the alignment system 20 will be referenced with the same characters using a prime suffix.

Figure 15:
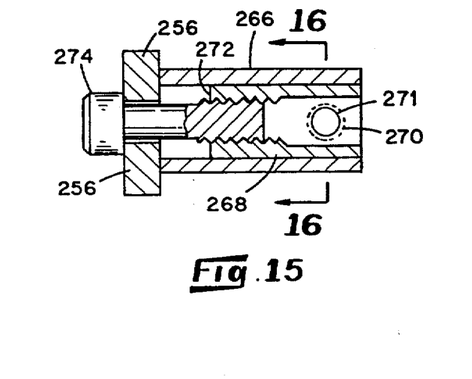
FIG. 15 is a cross-sectional view of an anvil.
Figure 16:
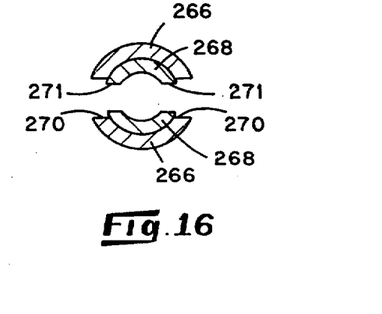
FIG. 16 is a cross-sectional view taken along line 16—16 of FIG. 15.

As best seen in FIGS. 14, 15 and 16, the tube clamp 242 includes a split ring 252 having abutting ends 254,256. A smoothbore 258 and a corresponding and aligned threaded bore 260 are provided through the ends 254,256, respectively, for receiving a mounting screw 262. The diameter of the split ring 252 is adjusted by turning the mounting screw 262 to adjust the spacing between the ends 254,256. For example, the diameter of the split ring 252 is increased by increasing the spacing between the ends 254,256 and vice-versa. Accordingly, the tube clamp 242 is mounted to an opposite end 264 of the tube by positioning the split ring 252 around the tube 240 and tightening the screw 262 to bring the ends 254,256 together so that the clamp 242 is tightly secured to the tube 240. The tip 246 is attached to the end 256 of the clamp 242 by means of an anvil 264.

As best seen in FIG. 14, the anvil 2614 includes an outer elongate hollow cylinder 266 and a barrel 268 slidably received within the cylinder 266. The cylinder 266 and barrel 268 have corresponding and aligned openings 270, 271, respectively, passing therethrough for receiving the tip 246. A threaded bore 272 extends the length of the barrel 268 for receiving a mounting screw 274.

The tip 246 has a main straight section 276 and an angled section 278. The section 276 has a length R of between about 2 and 3 inches and the section 278 has a length S of about ½ inch. The radius of curvature T between the sections 276 and 278 is about 0.25 inches and a 0.313 inch diameter stainless steel ball 280 is secured to the end of the section 278 for contacting the plunger 186' of the alignment system 22, as shown in FIG. 13.

To mount the tip 246 to the extension tube, the barrel 268 is positioned within the cylinder 266 so that the openings 270,271 are aligned and the free end of the section 276 is passed through the openings 270,271 so that the section 276 extends through the cylinder 266 and the barrel 268. A plastic cap 284 may then be placed over the free end of the section 276 to prevent the tip 246 from sliding back through the openings 270,271 during mounting. The ends of the cylinder 266 and barrel 268 are then aligned so that the threaded bore 272 is aligned with an opening 286 extending through the end 256 of the split ring 252 and the mounting screw 274 is passed through the opening 286 and threadably received within the threaded bore 272 to draw the barrel 268 toward tip section 276 and thereby secure the tip 246 in place.

Referring to FIGS. 15 and 16, cross sectional views of the anvil 264, it can be seen that adjustment of the screw 274 relative to the bore 272 permits the openings 270,271 to be moved relative to one another to provide a clamping action on the tip section 276, and to tighten the barrel 268 and cylinder 266 tightly against the end 256 of the clamp 242.

For example, when the screw 274 is tightened or screwed into the bore 272, the barrel 268 is advanced or drawn towards the end 256 of the split ring 252 and the opening 271 is shifted out of alignment with the opening 270 in the direction of the end 256. Thus, since the tip section 276 occupies the openings 270,271, movement of the barrel 268 towards the end 256 causes the opening 271 to shift such that the openings 270 and 271 bear tightly against opposite sides of the tip section 276 to trap and hold the tip section in place. In addition, it will be appreciated that tightening of the screw 274 also draws the cylinder 266 towards the end 256 so that when the tip 246 is tightly secured within the thus shifted openings 270,271, the end of the cylinder 266 adjacent the end 256 is held tightly against the end 256 and prevented from moving.

The tip assembly enables convenient, pinpoint adjustment of the tips in 3-dimensional space so that errors attributable to poor alignment of the tips on the plungers or errors caused by unintended slippage or movement of the tips is avoided. For example, before the tip section 276 is tightly secured, it may be adjusted in a horizontal plane by sliding the length of the tip section 276 within the aligned openings, adjusted in a vertical plane by exerting force on the tip 246 to cause rotation of the barrel 268 and cylinder 266 about their length axis, and adjusted by rotating the tip 246 around its length axis to change the orientation of the angled section 278 and the ball 280 in space.

Once the tip 246 is positioned at a desired orientation in space, the tip may be secured in this position by simply tightening the screw 274. As will be appreciated, the orientation of the tip 246 may be accomplished with one hand and the screw 274 tightened with the other hand. Thus, the configuration of the anvil 264 permits one person to easily position and set the tip in one convenient step and without assistance. In addition, it will be appreciated that this configuration results in only a relatively small amount of weight supported at the outer end of the tube. This is advantageous since it reduces the weight of the extension assembly so that error due to sag is reduced.

Operation of the Alignment System

Referring again to FIG. 1, to measure the misalignment of the shafts 10,12, the alignment systems 20,22 are mounted on the shafts 10,12. This is typically accomplished by first mounting the mounting base 30, of the system 20 in the manner described previously. The mounting base of the system 22 is then mounted in a like manner so that the bases are at the same rotational position (typically level) and the chains are secured so that they do not flop or otherwise bump the mounting bases 30, 30' or shafts 10, 12 during the taking of measurements. The spacing between the mounting bases 30, 30' is preferably selected to be as far apart as the machine environment permits.

Referring to FIGS. 1 and 2, after the mounting bases 30, 30' are mounted, the sensor heads assemblies 34, 34' may be mounted directly onto the bases 30, 30' if there is sufficient clearance to mount tube 240 over the coupling 14 and there is not much difference in the sizes of shafts 10 and 12. If there is not sufficient clearance, a combination of the binary blocks 32 that provides the desired clearance is mounted on the desired mounting bases 30, 30' and the sensor heads 34, 34' are mounted thereon.

The correct length of extension tubes 240, 240' for the spacing between the sensor heads are then mounted on each sensor head 182,182' and the tips 246,246' mounted so that the balls 280,280' contact the plungers 186' and 186, respectively.

It will be appreciated that the mechanical system of the present invention offers several advantages over previous devices, not the least of which is ease of assembly. For example, the chain assembly 28 and mounting block 30 configuration facilitates quick and efficient installation and prevents the chain 38 from flopping and causing errors in measurements.

In addition, the provision of binary blocks 150,152,154 in 1 inch, 2 inch, and 4 inch heights permits the sensor 180 to be quickly and easily positioned above the shaft 10 in one inch increments so that virtually any coupling and shaft size difference can be accommodated. Furthermore, the provision of color code codes 248 on the extension tubes 240 permits the system 20 to be used in a variety of machine environments and expedites location of the desired length extension tube.

The use of a capacitive displacement sensor 180 is advantageous because such sensor is easy to use, easier to read than analog devices, is easy to zero, indicates direction of plunger travel and eliminates parallax errors. Finally, it will be appreciated that the anvil 264 permits quick and pinpoint adjustment of the position of the tip 246 position and also maintains the tip securely in the set position so that errors attributable to improper tip positioning or tip movement may be eliminated.

The foregoing description of a preferred embodiment of the present invention has been provided for purposes of illustration only, and it is understood that numerous modifications or alterations may be made without departing from the spirit and scope of the invention as defined in the following claims.

What is claimed is:

1. A system for measuring misalignment of first and second rotatable in-line shafts, comprising:
   a first base positionable on said first rotatable shaft, said first base being releasably attachable to said first shaft at a first base location;

a second base positionable on said second rotatable shaft, said second base being releasably attachable to said second shaft at a second base location, and said first and second base locations being selected so that said first and second bases are positioned in an opposed relationship spaced apart by an approximate selected distance;

a sensor supportably connected to said first base for sensing position through a range of positions between a first measurement position and a second measurement position and for producing a measurement output corresponding to the sensed position;

a sensed point adjustably positionable between said first and second measurement positions for being sensed by said sensor, said sensor indicating the position of said sensed point;

an elongate extension projecting outwardly from said second base and toward said first base for disposing said sensed point for being sensed by said sensor, said elongate extension having a length substantially corresponding to the approximate selected distance between said first and second base locations and a free end suspended in space at a location adjacent to said first base; and a mount mechanically connected with said extension adjacent the free end of the extension to adjustably position said sensed point in three-dimensional space so that said sensed point may be adjustably positioned at a desired position defined as zero between said first and second measurement positions.

2. The system of claim 1, wherein said sensed point comprises a ball supported by said elongate extension.

3. The system of claim 2, wherein said mount comprises an anvil positionable on said elongate extension outwardly of said second base and supporting said ball, said anvil comprising a cylinder, a barrel concentrically and slidably disposed within the cylinder, and a rod having an elongate section and an angled section, said barrel and cylinder each having a pair of alignable openings for receiving said elongate section of said rod when aligned and for securely engaging the received elongate section of said rod when not aligned, said sensed point being positioned in 3-dimensional space by sliding and rotating said elongate section within said aligned openings.

4. The system of claim 1 wherein said mount and sensed point comprise:
a clamp for slidably mounting and clamping onto said elongate extension;
a clamp adjustment for varying the clamping force of the clamp against said elongate extension;
a smooth bore extending through a portion of said clamp;
a threaded bolt extending through and being dimensioned to fit said smooth bore;
a barrel having a threaded axial bore and an opening extending through said barrel in a direction perpendicular to said threaded axial bore;
a cylinder having a smooth axial bore and an opening extending through said cylinder in a direction perpendicular to said smooth axial bore;
said barrel being disposed in said smooth bore of said cylinder with the openings of said barrel and said cylinder being substantially aligned;
said threaded axial bore of said barrel receiving and mating with said threaded bolt to mount said barrel and cylinder on said clamp;
said barrel being shorter in length than said cylinder from their respective openings to their respective ends adjacent the clamp so that tightening the threaded bolt will force the barrel toward the clamp and tend to misalign the openings of said barrel and cylinder;
a rod disposed within the openings of said cylinder and barrel for being clamped therein when said bolt is tightened and being slidably disposed therein when said bolt is loosened, said rod including a straight section and an angled section extending from the end of the straight section at an angle; and
a ball disposed on said angled section of said rod for being positioned to a desired location by rotating the straight section of said rod about its axis and axially sliding said straight section in said openings while said bolt is loosened.

5. The system of claim 1, wherein said sensor comprises a capacitive displacement sensor.

6. The system of claim 1, further comprising an elongate chain securable at one end to said first base for positioning said first base adjacent said first shaft and means for securing the other end of the chain so that the chain is maintained in a substantially stationary position relative to the first shaft during the taking of measurements.

7. The system of claim 1, further comprising a support for supportably positioning said sensor at a desired height above said first base in one unit increments, said support comprising a first support block having a height of about one unit, a second support block having a height of about two units, and a third support block having a height of about four units.

8. The system of claim 1, further comprising a plurality of stackable binary blocks configured for being attached and stacked on either of said first and second bases to raise the height of at least one of said sensor and said sensed point, said plurality of binary blocks including at least a first binary block having a height of one unit and a second binary block having a height of two units so that a height increase of one unit may be achieved by attaching one block to one of said bases, a height increase of two units may be achieved by attaching the second block to one of the bases, and a height increase of three units may be achieved by attaching the first and second blocks to one of the bases.

9. The system of claim 1, further comprising an attachment chain for positioning one of said bases on one of said shafts, said attachment chain comprising:
an elongate chain having first and second ends and a mid-region defined between the first and second ends;
a chain attachment for attaching the first end of the chain to one of said bases;
a catch for securing the mid-region of the chain to said one of said bases; and
a chain clip for clipping the second end of the chain to the mid-region of the chain.

10. A system for measuring misalignment of first and second rotatable in-line shafts, comprising:
a first base positionable on said first rotatable shaft;
first attachment means for releasably attaching said first base to said first shaft at a first base location;
a second base positionable on said second rotatable shaft;

second attachment means for releasably attaching said second base to said second shaft at a second base location, said first and second base locations being selected so that said first and second bases are positioned in an opposed relationship spaced apart by an approximate selected distance;

sensor means supportably connected to said first base for sensing position through a range of positions between a first measurement position and a second measurement position and for producing a measurement output corresponding to the sensed position;

sensed means positioned between said first and second measurement positions for being sensed by said sensor means, said sensed means being mechanically associated with said second base so that the position of said sensed means corresponds to the position of said second base;

a plurality of binary blocks for being selectively interposed between the first base and the sensor means or the second base and the sensed means, whereby said binary blocks may be used to increase the height of the sensor means or the sensed means above first and second shafts, respectively;

said binary blocks including at least a first block having a height of one unit and a second block having a height of two units, said first and second blocks being configured for attaching and stacking on each other and on either of said first and second bases, whereby the height of the sensor means or the sensed means may be increased by one unit using the first block, by two units using the second block, and by three units using the first and second blocks.

11. The system of claim 10 further comprising a third binary block having a height of four units.

12. A system for measuring misalignment of first and second rotatable in-line shafts, comprising:

a first base positionable on said first rotatable shaft, said first base being releasably attachable to said first shaft at a first base location;

a second base positionable on said second rotatable shaft, said second base being releasably attachable to said second shaft at a second base location, and said first and second base locations being selected so that said first and second bases are positioned in an opposed relationship spaced apart by an approximate selected distance;

a sensor supportably connected to said first base for sensing position through a range of positions between a first measurement position and a second measurement position and for producing a measurement output corresponding to the sensed position;

a sensed point adjustably positionable between said first and second measurement positions for being sensed by said sensor, said sensor indicating the position of said sensed point and said sensed point comprising a ball;

an elongate extension projecting outwardly from said second base and toward said first base for disposing said sensed point for being sensed by said sensor, said elongate extension having a length substantially corresponding to the approximate selected distance between said first and second base locations; and a mount mechanically connected with said extension to adjustably position said sensed point in space so that said sensed point may be adjustably positioned at a desired position defined as zero between said first and second measurement positions, wherein said mount comprises an anvil positionable on said elongate extension outwardly of said second base and supporting said ball, said anvil comprising a cylinder, a barrel concentrically and slidably disposed within the cylinder, and a rod having an elongate section and an angled section, said barrel and cylinder each having a pair of alignable openings for receiving said elongate section of said rod when aligned and for securely engaging the received elongate section of said rod when not aligned, said sensed point being positioned in 3-dimensional space by sliding and rotating said elongate section within said aligned openings.

13. A system for measuring misalignment of first and second rotatable in-line shafts, comprising:

a first base positionable on said first rotatable shaft, said first base being releasably attachable to said first shaft at a first base location;

a second base positionable on said second rotatable shaft, said second base being releasably attachable to said second shaft at a second base location, and said first and second base locations being selected so that said first and second bases are positioned in an opposed relationship spaced apart by an approximate selected distance;

a sensor supportably connected to said first base for sensing position through a range of positions between a first measurement position and a second measurement position and for producing a measurement output corresponding to the sensed position;

a sensed point adjustably positionable between said first and second measurement positions for being sensed by said sensor, said sensor indicating the position of said sensed point;

an elongate extension projecting outwardly from said second base and toward said first base for disposing said sensed point for being sensed by said sensor, said elongate extension having a length substantially corresponding to the approximate selected distance between said first and second base locations; and a mount mechanically connected with said extension to adjustably position said sensed point in space so that said sensed point may be adjustably positioned at a desired position defined as zero between said first and second measurement positions, wherein said mount and sensed point comprise:
 a clamp for slidably mounting and clamping onto said elongate extension;
 a clamp adjustment for varying the clamping force of the clamp against said elongate extension;
 a smooth bore extending through a portion of said clamp;
 a threaded bolt extending through and being dimensioned to fit said smooth bore;
 a barrel having a threaded axial bore and an opening extending through said barrel in a direction perpendicular to said threaded axial bore;
 a cylinder having a smooth axial bore and an opening extending through said cylinder in a direction perpendicular to said smooth axial bore;
 said barrel being disposed in said smooth bore of said cylinder with the openings of said barrel and said cylinder being substantially aligned;

said threaded axial bore of said barrel receiving and mating with said threaded bolt to mount said barrel and cylinder on said clamp;

said barrel being shorter in length than said cylinder from their respective openings to their respective ends adjacent the clamp so that tightening the threaded bolt will force the barrel toward the clamp and tend to misalign the openings of said barrel and cylinder;

a rod disposed within the openings of said cylinder and barrel for being clamped therein when said bolt is tightened and being slidably disposed therein when said bolt is loosened, said rod including a straight section and an angled section extending from the end of the straight section at an angle; and a ball disposed on said angled section of said rod for being positioned to a desired location by rotating the straight section of said rod about its axis and axially sliding said straight section in said openings while said bolt is loosened.

14. A system for measuring misalignment of first and second rotatable in-line shafts, comprising:

a first base positionable on said first rotatable shaft, said first base being releasably attachable to said first shaft at a first base location;

a second base positionable on said second rotatable shaft, said second base being releasably attachable to said second shaft at a second base location, and said first and second base locations being selected so that said first and second bases are positioned in an opposed relationship spaced apart by an approximate selected distance;

a sensor supportably connected to said first base for sensing position through a range of positions between a first measurement position and a second measurement position and for producing a measurement output corresponding to the sensed position;

a sensed point adjustably positionable between said first and second measurement positions for being sensed by said sensor, said sensor indicating the position of said sensed point;

an elongate extension projecting outwardly from said second base and toward said first base for disposing said sensed point for being sensed by said sensor, said elongate extension having a length substantially corresponding to the approximate selected distance between said first and second base locations;

a mount mechanically connected with said extension to adjustably position said sensed point in space so that said sensed point may be adjustably positioned at a desired position defined as zero between said first and second measurement positions; and a support for supportably positioning said sensor at a desired height above said first base in one unit increments, said support comprising a first support block having a height of about one unit, a second support block having a height of about two units, and a third support block having a height of about four units.

15. A system for measuring misalignment of first and second rotatable in-line shafts, comprising:

a first base positionable on said first rotatable shaft, said first base being releasably attachable to said first shaft at a first base location;

a second base positionable on said second rotatable shaft, said second base being releasably attachable to said second shaft at a second base location, and said first and second base locations being selected so that said first and second bases are positioned in an opposed relationship spaced apart by an approximate selected distance;

a sensor supportably connected to said first base for sensing position through a range of positions between a first measurement position and a second measurement position and for producing a measurement output corresponding to the sensed position;

a sensed point adjustably positionable between said first and second measurement positions for being sensed by said sensor, said sensor indicating the position of said sensed point;

an elongate extension projecting outwardly from said second base and toward said first base for disposing said sensed point for being sensed by said sensor, said elongate extension having a length substantially corresponding to the approximate selected distance between said first and second base locations;

a mount mechanically connected with said extension to adjustably position said sensed point in space so that said sensed point may be adjustably positioned at a desired position defined as zero between said first and second measurement positions; and a plurality of stackable binary blocks configured for being attached and stacked on either of said first and second bases to raise the height of at least one of said sensor and said sensed point, said plurality of binary blocks including at least a first binary block having a height of one unit and a second binary block having a height of two units so that a height increase of one unit may be achieved by attaching one block to one of said bases, a height increase of two units may be achieved by attaching the second block to one of the bases, and a height increase of three units may be achieved by attaching the first and second blocks to one of the bases.

* * * * *